(12) United States Patent
Lutz et al.

(10) Patent No.: US 11,444,934 B2
(45) Date of Patent: Sep. 13, 2022

(54) SYSTEM AND METHOD FOR DYNAMIC ALLOCATION OF AUTOMATION UNITS TO AUTOMATION SERVERS

(71) Applicant: Siemens Aktiengesellschaft, Munich (DE)

(72) Inventors: Benjamin Lutz, Pfinztal (DE); Anna Palmin, Karlsruhe (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 94 days.

(21) Appl. No.: 17/115,246

(22) Filed: Dec. 8, 2020

(65) Prior Publication Data
US 2021/0176231 A1 Jun. 10, 2021

(30) Foreign Application Priority Data
Dec. 9, 2019 (EP) .................. 19214476

(51) Int. Cl.
*H04L 9/32* (2006.01)
*H04L 9/40* (2022.01)
*G05B 19/418* (2006.01)

(52) U.S. Cl.
CPC ...... *H04L 63/0823* (2013.01); *G05B 19/4185* (2013.01); *H04L 63/101* (2013.01); *H04L 63/108* (2013.01); *H04L 63/126* (2013.01)

(58) Field of Classification Search
CPC . H04L 63/0823; H04L 63/101; H04L 63/108; H04L 63/126; H04L 12/4625; H04L 9/3268; H04L 67/12; G05B 19/4185
See application file for complete search history.

(56) References Cited

U.S. PATENT DOCUMENTS

| | | | | |
|---|---|---|---|---|
| 9,979,625 | B2 * | 5/2018 | McLaughlin | H04W 4/70 |
| 2016/0057134 | A1 * | 2/2016 | Falk | G06F 21/335 |
| | | | | 726/6 |

(Continued)

FOREIGN PATENT DOCUMENTS

| | | |
|---|---|---|
| DE | 102016015766 | 11/2017 |
| EP | 3462313 | 4/2019 |
| WO | 2017145006 | 8/2017 |

OTHER PUBLICATIONS

Christidis Konstantinos et al: "Blockchains and Smart Contracts for the Internet of Things", IEEE Access, vol. 4, pp. 2292-2303, retrieved on Jun. 3, 2016.

(Continued)

*Primary Examiner* — Amie C. Lin
(74) *Attorney, Agent, or Firm* — Cozen O'Connor

(57) ABSTRACT

An automation system includes at least one automation unit, multiple automation servers and a central management unit interconnected via a communication network, wherein the automation servers communicate with the automation unit using a pre validated certificate of the automation unit, where in order to validate the certificate, the automation servers check a chain of trust of the respective certificate and, by accessing a black list, the validity thereof, where communication of the respective chain of trust only occurs when corresponding chains of trust are revoked from all other automation servers beforehand, corresponding certificates are entered into the black list or the certificate is otherwise invalid.

8 Claims, 7 Drawing Sheets

(56) References Cited

U.S. PATENT DOCUMENTS

2018/0054318 A1\* 2/2018 Schmirler ............. H04L 67/125
2019/0058592 A1   2/2019 Wright et al.
2020/0059373 A1\* 2/2020 Norum ................ H04L 63/0823

OTHER PUBLICATIONS

EP Search Report dated May 26, 2020 based on EP19214476 filed Dec. 9, 2019.

\* cited by examiner

SYSTEM AND METHOD FOR DYNAMIC ALLOCATION OF AUTOMATION UNITS TO AUTOMATION SERVERS

BACKGROUND OF THE INVENTION

1. Field of the Invention

The present invention is based on a for method operating an automation system, where the automation system comprises at least one automation unit and a plurality of automation servers, the automation servers are connected to the automation unit via a communication network, the automation servers communicate with the automation unit using a certificate of the automation unit that has been communicated to them, where the automation servers validate the certificate of the automation unit prior to communication with the automation unit, the automation unit controls an installation part of an industrial technical installation in accordance with the communication with the respective automation server, the automation servers, in order to validate the certificate, on the one hand, check a chain of trust of the certificate and, on the other hand, check a validity of the certificate by accessing a black list, and where the black list is stored at a storage location and a reference to the storage location is contained in the communicated certificate.

The present invention is furthermore based on an automation system, where the automation system comprises at least one automation unit and a plurality of automation servers, the automation servers are connected to the automation unit via a communication network, the automation servers are programmed such that they communicate with the automation unit using a certificate of the automation unit that has been communicated to them, and the automation servers validate the certificate of the automation unit prior to communication with the automation unit, the automation unit is programmed such that it controls an installation part of an industrial technical installation in accordance with the communication with the respective automation server, the automation servers are furthermore programmed such that, in order to validate the certificate they, on the one hand, check a chain of trust of the certificate and, on the other hand, check a validity of the certificate by accessing a black list, and where the black list is stored at a storage location and a reference to the storage location is contained in the communicated certificate.

2. Description of the Related Art

In industrial process technology installations, there is an increasing demand for flexibility and scalability. This leads to installation parts being developed and manufactured separately as small units. Particularly in the pharmaceutical industry, these units are often referred to as package units. Each installation part is controlled by an automation unit, such as a programmable logic controller.

A plurality of installation parts, in their entirety, form an industrial installation. The associated automation units are controlled by an automation server, which is connected to the automation units via a communication network (for example, an Ethernet). The automation units control their respective installation part in accordance with the communication with the respective automation server. The automation units therefore accept the corresponding control commands or other commands from the automation server and deliver sensor signals, signals derived therefrom or internal states of the respective automation unit back to the automation server.

In addition to the modularity of the approach outlined above, there are furthermore also advantages with regard to the dynamic allocation of the individual installation parts to a particular industrial installation. For example, it is possible for a particular installation part to initially form a component of a first industrial installation, and at a later point in time to be split off from the first industrial installation and allocated to a second industrial installation.

In order to be used in the context of the second industrial installation after being used in the context of the first industrial installation, the installation part itself naturally has to be split off from the first industrial installation and incorporated into the second industrial installation. This transfer as such, i.e., the geometrical-mechanical-physical transfer of the installation part as such, is not the subject matter of the present invention. It must also be ensured, however, that, until the splitting off from the first industrial installation, the corresponding automation unit is accessed by the automation server of the first industrial installation and only this automation server, and following the incorporation into the second industrial installation, the corresponding automation unit is accessed by the automation server of the second industrial installation and only this automation server. Therefore, in addition to the geometrical-mechanical-physical transfer of the installation part, the associated communication-related transfer of the associated automation unit must also occur.

In the prior art, for the communication-related transfer, the engineering of the two automation servers involved is changed. Each engineering contains parameterizations, which indicate which installation parts (more precisely: from the perspective of the respective automation server, which automation units) have to be present, in order to implement the respective automation task. The engineering also contains information regarding communication paths for the respective automation units.

This procedure is inconvenient, time consuming and error prone. This procedure is inconvenient and time consuming because, for both the automation server of the first industrial installation and for the automation server of the second industrial installation, in each case the engineering must be changed and loaded into the respective automation server. The procedure is error prone because both the engineering as such may contain errors and errors may also be made during the sequence of events. In particular, it may occur that the automation unit of a particular installation part is allocated to the automation server of the second industrial installation at a point in time, at which the automation unit is still also allocated to the automation server of the first industrial installation. Here, the two automation servers compete with one another. Conversely, if it is ensured that the automation unit of the installation part is first split off at the first automation server and, only after this, is incorporated at the second automation server, then a relatively large period of time elapses between the splitting off at the one automation server and the incorporation at the other automation server, during which the associated installation part cannot be used. The productivity is reduced as a result.

SUMMARY OF THE INVENTION

In view of the foregoing, it is an object of the present invention to provide a system and method for the communication-related transfer of an automation unit, i.e., the splitting off at one automation server and the incorporation at another automation server, in a simple and efficient manner.

This and other objects and advantages are achieved by an operating method, where the automation system additionally comprises a central management unit, which is connected to the automation servers and the automation unit via the communication network, the central management unit, in order to enable the communication of the respective automation server with the respective automation unit, communicates the respective chain of trust to the respective automation server, the central management unit, in order to prevent the communication of a respective automation server with the automation unit, revokes the respective chain of trust from the respective automation server or prompts the certificate of the automation unit to be entered into the black list and the central management unit only communicates the respective chain of trust to a respective automation server when it has revoked all chains of trust determined for communication with the automation unit from all other automation servers beforehand, or has prompted a certificate of the automation unit, that has been valid until this point in time, to be entered into the black list, or the certificate of the automation unit is otherwise invalid.

The present invention is based on the knowledge that the communication between the respective automation server and the automation unit occurs using secure communication protocols, which are used by certificates in accordance with the X.509 standard. Examples of protocols of this kind are Open Platform Communications (OPC), Unified Architecture (UA), Transport Layer Security (TLS) and others. The certificates mentioned are defined in the context of the X.509 standard. A communication of a unit with a communication partner only occurs, however, when the unit has not only obtained the certificate of its communication partner, but it is also able to validate the obtained certificate via the associated chain of trust and the certificate has not been entered into the black list and is not otherwise invalid. Another type of invalidity may occur due to a time lapse, for example, because certificates are usually only valid for a limited period of time.

The central management unit therefore ensures that an automation server is only then able to use a certificate if it is ensured that no other automation server has a valid, unblocked certificate and the chain of trust associated therewith. As long as there is this risk, the certificate is not communicated to the corresponding (new) automation server. In individual cases, this may temporarily also include the state in which the data required for communication with the same automation unit is not available to a single automation server. Under no circumstances, however, it is possible for the situation to occur, in which data required for communication with the same automation unit is available to more than one automation server.

With this procedure, it is possible for the engineering of the automation servers to only be created once, after which it is no longer changed. As a result, this means that the automation servers ascertain, based on a respective parameterization, whether they must communicate with the automation unit to perform an automation task specific to them, but that the parameterization of the automation servers occurs independently of the communication and the revocation of chains of trust and the blocking of certificates.

In order to allocate installation parts or the associated automation units to a particular automation server, the procedure can be followed in particular such that, in order to obtain a respective chain of trust, the respective automation server requests the allocation of the automation unit at the central management unit, and such that the central management unit, based on the request, undertakes the revocation of the chain of trust of a certificate of the automation unit communicated to another automation server, or prompts the blocking of a certificate of the automation unit communicated to another automation server and undertakes the communication of the respective chain of trust to the requesting automation server.

All automation servers can therefore have the information, on an ongoing basis, on which installation parts (more precisely: from the perspective of the respective automation server, which automation units) must be present, in order to perform the respective automation task. This may also include the situation where particular installation parts and the associated automation units are used multiple times in the context of the engineering (or the parameterizations). However, as a result of the central management unit ensuring that a maximum of one single automation server can access a particular automation unit at a particular point in time, access conflicts are avoided. As a result, the central management unit therefore releases the access of the respective automation server to a particular automation unit on demand and again also blocks the access on demand.

It is also an object of the invention to provide an automation system that is configured such that the automation system additionally comprises a central management unit, which is connected to the automation servers and the automation unit via the communication network, where the central management unit is programmed such that, in order to enable the communication of the respective automation server with the automation unit, the central management unit communicates the respective chain of trust to the respective automation server, in order to prevent the communication of a respective automation server with the automation unit, the central management unit revokes the respective chain of trust from the respective automation server or prompts the certificate of the automation unit to be entered into the black list and the central management unit only communicates the respective chain of trust to a respective automation server when it has revoked all chains of trust determined for communication with the automation unit from all other automation servers beforehand, or has prompted a certificate of the automation unit, which has been valid until this point in time, to be entered into the black list, or the certificate of the automation unit is otherwise invalid.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The above-described properties, features and advantages of this invention and the manner in which they are achieved are made more clearly and distinctly intelligible in conjunction with the following description of the exemplary embodiments which are described in greater detail in conjunction with the schematic representation of the drawings, in which.

DETAILED DESCRIPTION OF THE EXEMPLARY EMBODIMENTS

Figure 1:
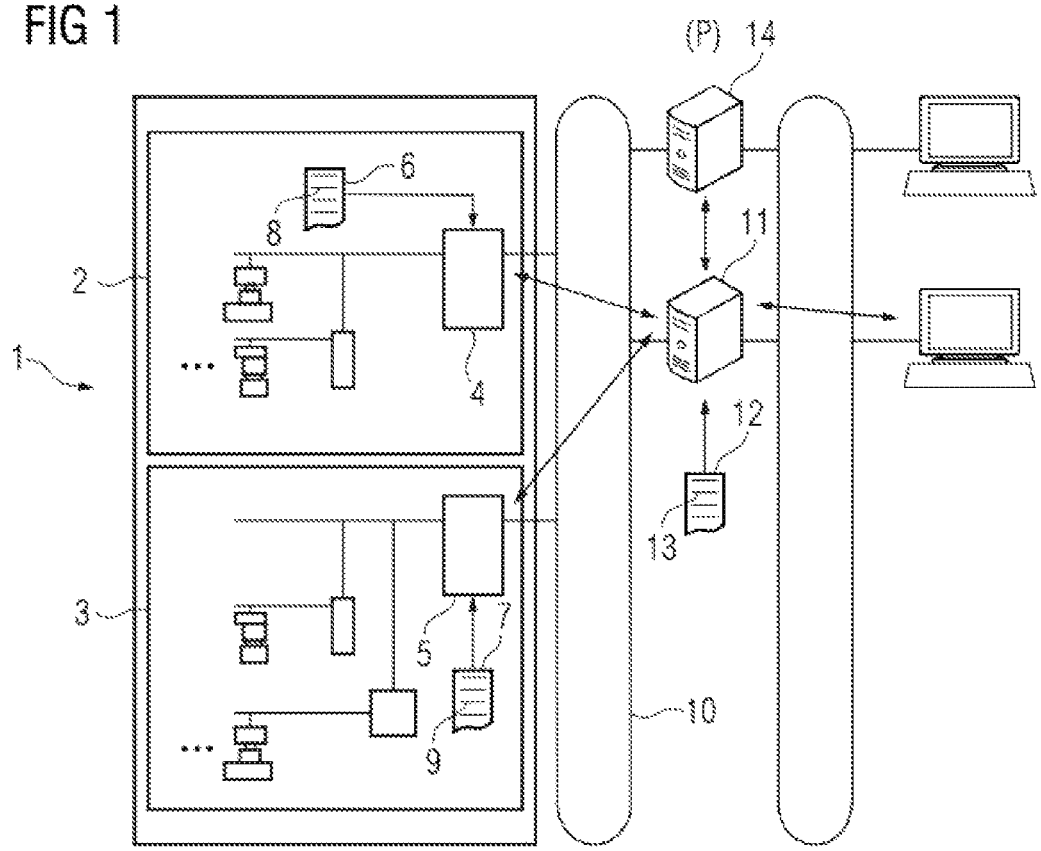
FIG. 1 shows an industrial technical installation and the automation structure thereof in accordance with the invention.

In many cases, such as in the pharmaceutical industry, an industrial technical installation 1 according to the representation in FIG. 1 consists of a plurality of installation parts 2, 3. The installation parts 2, 3, in practice often referred to as package units, are each controlled by an automation unit 4, 5. The automation units 4, 5 may be programmable logic controllers, for example. Regardless of the specific design, however, the mode of operation of the automation units 4, 5 is determined by a corresponding program 6, 7, with which the respective automation unit 4, 5 is programmed. The programs 6, 7 comprise machine code 8, 9 that can be processed by the respective automation unit 4, 5. The functions and actions of the automation units 4, 5 explained below therefore occur with the processing and on the basis of the processing of the corresponding machine code 8, 9 by the respective automation unit 4, 5.

The installation parts 2, 3 work together. To this end, the automation units 4, 5 communicate with an automation server 11 via a communication network 10. The automation server 11 controls the industrial technical installation 1 via the automation unit 4, 5. In particular, the automation server 11 also coordinates the automation units 4, 5 and therefore also the installation parts 2, 3. The mode of operation of the automation server 11 is determined by a corresponding program 12, with which the automation server 11 is programmed. The program 12 comprises machine code 13, which can be processed by the automation server 11. The functions and actions of the automation server 11 explained below therefore occur with the processing and on the basis of the processing of the corresponding machine code 13 by the automation server 11.

Based on a parameterization P, the automation server 11 ascertains which automation units 4, 5 must be present and with which the automation server 11 accordingly also must be able to communicate, in order to exchange the correct information with the automation units 4, 5, such that the automation units 4, 5 can fulfill their respective automation-related subtask and the automation server 11 can fulfill its automation-related overall task. The parameterization P may be recorded in an engineering server 14, for example, to which the automation server 11 has access.

The communication between the automation units 4, 5 and the automation servers 11 occurs in accordance with a secure protocol, which uses certificates Z in accordance with the X.509 standard (as of October 2016). "Secure" means that an asymmetrical encryption method is used and, in the context of the creation and utilization of the transmitted messages, i.e., in the context of the overall communication, certificates Z of the automation units 4, 5 are used.

The typical structure of a certificate Z in accordance with the X.509 standard is explained below in connection with FIG. 2. This structure applies both for the certificates Z of the automation units 4, 5 and for certificates Z of other units.

Figure 2:
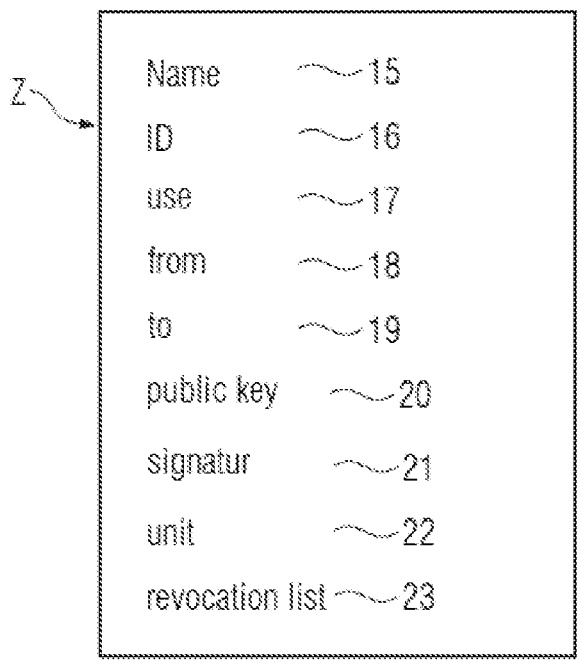
FIG. 2 shows a certificate in accordance with the invention.

With reference to FIG. 2, a certificate Z usually has the name 15 and an identifier 16, which are related to the unit to which the certificate Z is allocated. In the context of the present invention, for example, the unit may be one of the automation units 4, 5. Furthermore, the certificate Z usually has an indication 17 of the intended use of the certificate Z in clear text or in an encoded format, such as the certificate Z is used for communication or for the authorization of other certificates. Furthermore, the certificate Z usually has an earliest and a latest point in time 18, 19. The certificate Z is valid between the earliest point in time 18 and the latest point in time 19; at all other times, it is invalid. Furthermore, the certificate Z contains the public key 20 of an asymmetrical encryption method. This public key 20 may be used, for example, in order to encrypt messages that are determined for the unit to which the certificate Z is allocated. The public key 20 may also be used in order to review the validity of the signature for messages which have been created by the unit to which the certificate Z is allocated. In addition to these purposes, there are also other purposes for which the public key 20 may be used. Furthermore, the certificate Z contains a signature 21 of the unit that has created the certificate Z.

Figure 3:
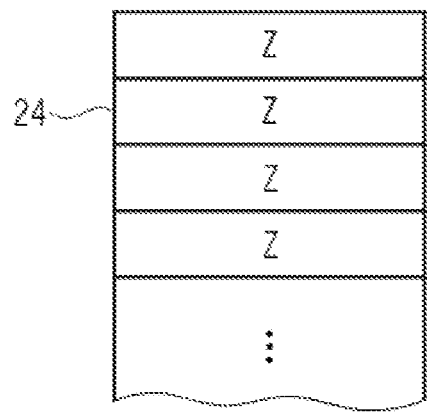
FIG. 3 shows a black list in accordance with the invention.

With a certificate Z, the relationship between the private key of the unit to which the certificate Z is allocated (and thus the identity thereof) and the public key 20 is established. In order for the certificate Z to be demonstrably trustworthy, it should be signed by a trustworthy unit, where the trustworthiness of the unit should be demonstrable where possible. In order to ensure this, the signature 21 is created by the unit that has created the certificate Z, with its private (or secret) key. This private key does not match the public key 20 of the certificate Z, but rather is a different key. Based on the signature 21, it is possible to review whether the public key 20 contained in the certificate Z is in proper order. The associated public key for decrypting the signature 21 is generally specified in the certificate Z of the unit that has created the certificate Z. This public key may be used to check whether the mentioned unit is trustworthy. Furthermore, the certificate Z contains an indication 22 of the unit that created the certificate Z. Finally, the certificate Z contains a reference 23 to a storage location of a black list 24 (see FIG. 3). Recorded in the black list 24 according to FIG. 3 are certificates Z that have been blocked and therefore are no longer valid.

Specifically, in order to realize the communication with the automation unit 5 for example, the automation server 11 perform an operating method, as explained in greater detail below in connection with FIG. 4.

Figure 4:
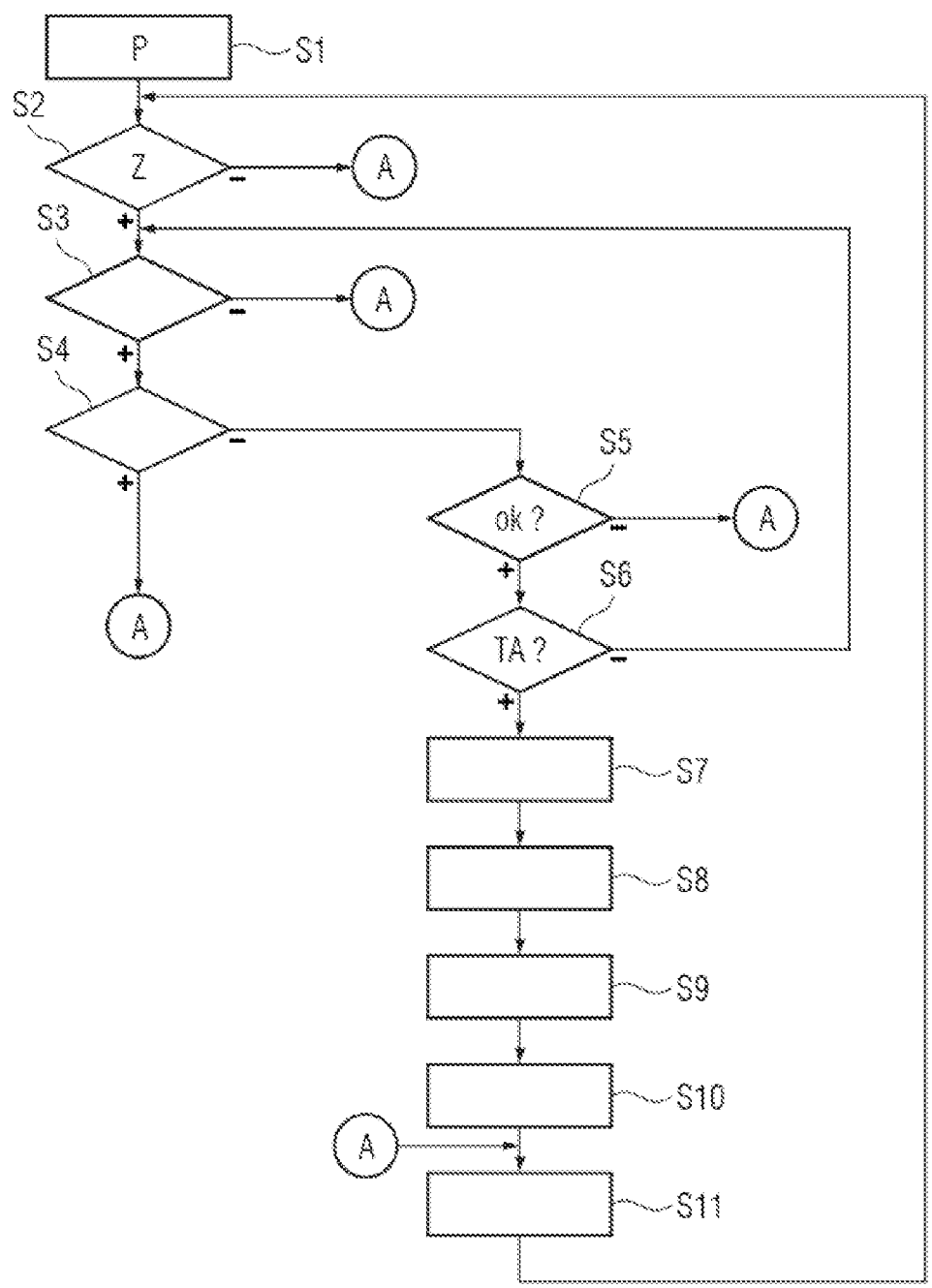
FIG. 4 shows a flow diagram in accordance with an embodiment of the invention.

With reference to FIG. 4, a parameterization P is known to the automation server 11 in a step S1. For example, in step S1, the automation server 11 may access the engineering server 14, where it reads out the parameterization P.

In a step S2, the automation server 11 checks whether a certificate Z of the automation unit 5 is available to it, i.e., a certificate Z that is allocated to the automation unit 5. Alternatively, the automation server 11 may begin a communication process with the automation unit 5 (i.e., establish what is known as a "session"), by sending its own certificate Z to the automation unit 5 and subsequently receiving the certificate Z sent back by said automation unit 5.

If the certificate Z of the automation unit 5 is available to the automation server 11, then the automation server 11 proceeds to a step S3. In step S3, the automation server 11 checks whether the certificate Z discovered or obtained in step S2 is valid. The checks in step S3 occur based on the certificate Z as such, i.e., without utilizing other information than the information that is contained in the certificate Z itself. For example, in step S3 the automation server 11 may check whether the point in time at which the automation server 11 performs the step S3 lies within the validity period of the certificate Z, i.e., between the earliest point in time 18 and the latest point in time 19.

If the certificate Z is valid, then the automation server 11 proceeds to a step S4. In step S4, the automation server 11 checks whether the certificate Z discovered in step S2 has been blocked. To this end, the automation server 11 accesses the black list 24. This access is possible because the information regarding the storage location at which the black list 24 is stored is contained in the certificate Z itself.

If the certificate Z is not blocked, then the automation server 11 proceeds to a step S5. In step S5, the automation server 11 checks whether the signature 21 is in proper order. To this end, the automation server 11 needs the public key 20 and thus as a result needs the certificate Z of the unit that created the certificate Z discovered or obtained in step S2 and checked in steps S3 and S4. If this certificate Z, i.e., the certificate Z of the unit that created the certificate Z checked in steps S3 and S4, is present and if the result of the check is that the signature 21 is in proper order, then the automation server 11 proceeds to a step S6.

In step S6, the automation server 11 checks whether the unit that created the certificate Z checked in steps S3 to S5 is what is known as a trust anchor. If this is not the case, then the automation server 11 returns to step S3. The automation server 11 now, however, performs steps S3 to S6 in relation to the certificate Z of the unit that created the certificate Z checked when steps S3 to S5 were performed the immediately previous time. As a result, the automation server 11 therefore validates the chain of trust by repeatedly carrying out steps S3 to S6.

The sequence of steps S3 to S6 is based on the consideration that the originally checked certificate Z is generally issued and signed by a higher-level unit. The higher-level unit is generally referred to as a certification authority (CA). The certificate Z of the certification authority is for its part in turn issued and signed by a further higher-level unit or certification authority. Eventually, however, the end of this chain is reached. A certificate Z is then present that is signed by the respective unit itself. This unit is what is known as a root certification authority (RCA), which is what is known as the trust anchor.

The automation server 11 thus performs steps S3 to S6 repeatedly until either the chain of trust needed for the validation of a certificate Z is not available to it or a certificate Z is invalid or blocked or it has reached a certificate Z that is valid, not blocked and signed by the unit, to which the certificate Z is allocated, itself. This chain of certificates Z, up to a certificate Z issued by the trust anchor, forms the chain of trust (trust chain).

If the automation server 11 identifies in step S6 that the certificate Z checked when steps S3 to S5 were performed the previous time is created by the trust anchor, then this implies that all certificates Z checked when steps S3 to S6 were repeatedly performed are available to the automation server 11, that all these certificates Z are valid and are signed in the proper manner and that none of the certificates Z are blocked. The certificate Z of the automation unit 5 is therefore also valid.

Only in this case does the automation server 11 proceed to steps S7 to S10. In step S7, the automation server 11 encrypts data, which is to be transmitted to the automation unit 5, with the public key 20 that is contained in the certificate Z of the automation unit 5. Furthermore, the automation server 11 signs the data in step S7. In step S8, the automation server 11 transmits the data encrypted and signed in step S7 to the automation unit 5. In step S9, the automation server 11 accepts the encrypted data from the automation unit 5. In step S10, the automation server 11 decrypts the encrypted data with the public key 20 that is contained in the certificate Z of the automation unit 5. The automation server 11 also reviews a signature, if necessary.

After performing step S10, the automation server 11 proceeds to a step S11. In step S11, the automation server 11 performs other tasks. The other tasks may (but do not have to) also include that the automation server 11 accepts new certificates Z or that certificates Z are revoked from it, so that they are no longer available to it. In all other cases, i.e., as soon as the automation server 11, when performing a respective step S2 to S6, ascertains that the respective certificate Z is not available to it or that although a certificate Z is available to it, the certificate Z is not valid or is blocked or the signature 21 thereof is not correct, then the automation server 11 proceeds directly to step S11, i.e. without previously carrying out steps S7 to S10.

Figure 5:
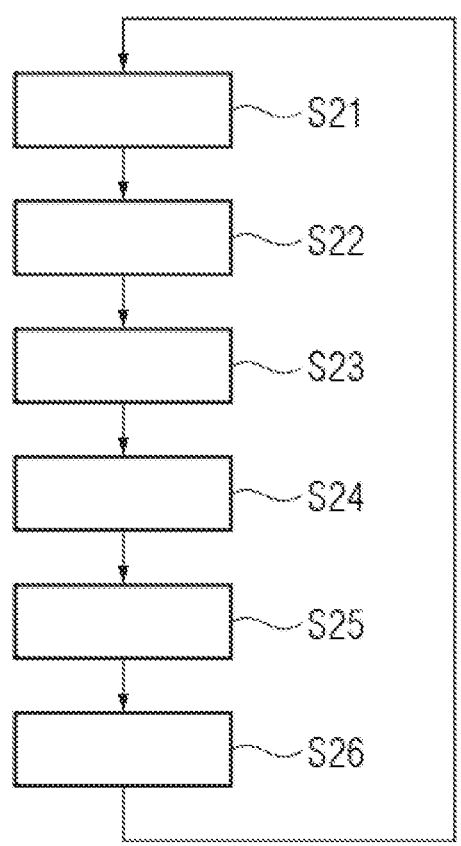
FIG. 5 shows a flow diagram in accordance with another embodiment of the invention.

The automation unit 5 performs a corresponding procedure, which is described in greater detail below in connection with FIG. 5. Thus, with reference to FIG. 5, the automation unit 5 accepts data from the automation server 11 in a step S21. Step S21 matches step S8. In step S22, the automation unit 5 decrypts the data accepted in step S21. This decryption occurs using the secret key for the public key 20, which is contained in the certificate Z of the automation unit 5. Furthermore, the automation unit 5 reviews the signature of the transmitted data. The secret key is generally only present within the automation unit 5. Step S22 matches step S7. In step S23, the automation unit 5 encrypts data that is to be transmitted to the automation server 11. This encryption occurs using the secret key for the public key 20, which is contained in the certificate Z of the automation unit 5. If necessary, the automation unit 5 signs the data. Step S23 matches step S10. In step S24, the automation unit 5 transmits the encrypted data to the automation server 11. Step S24 matches step S9.

After this, the automation unit 5 performs a step S25. In step S25, the automation unit 5 controls the installation part 3 in accordance with the communication with the automation server 11. Finally, the automation unit 5 performs a step S26. In step S26, the automation unit 5 performs other tasks. The other tasks may be of any nature. They may also include, in an individual case, the automation unit 5 accepting certificates Z or obtaining a new secret key.

The procedure explained above is known as such. In accordance with the invention, however, the certificates Z of the automation unit 5 are managed such that the access of the automation server 11 is controlled in a targeted manner as a result.

Figure 6:
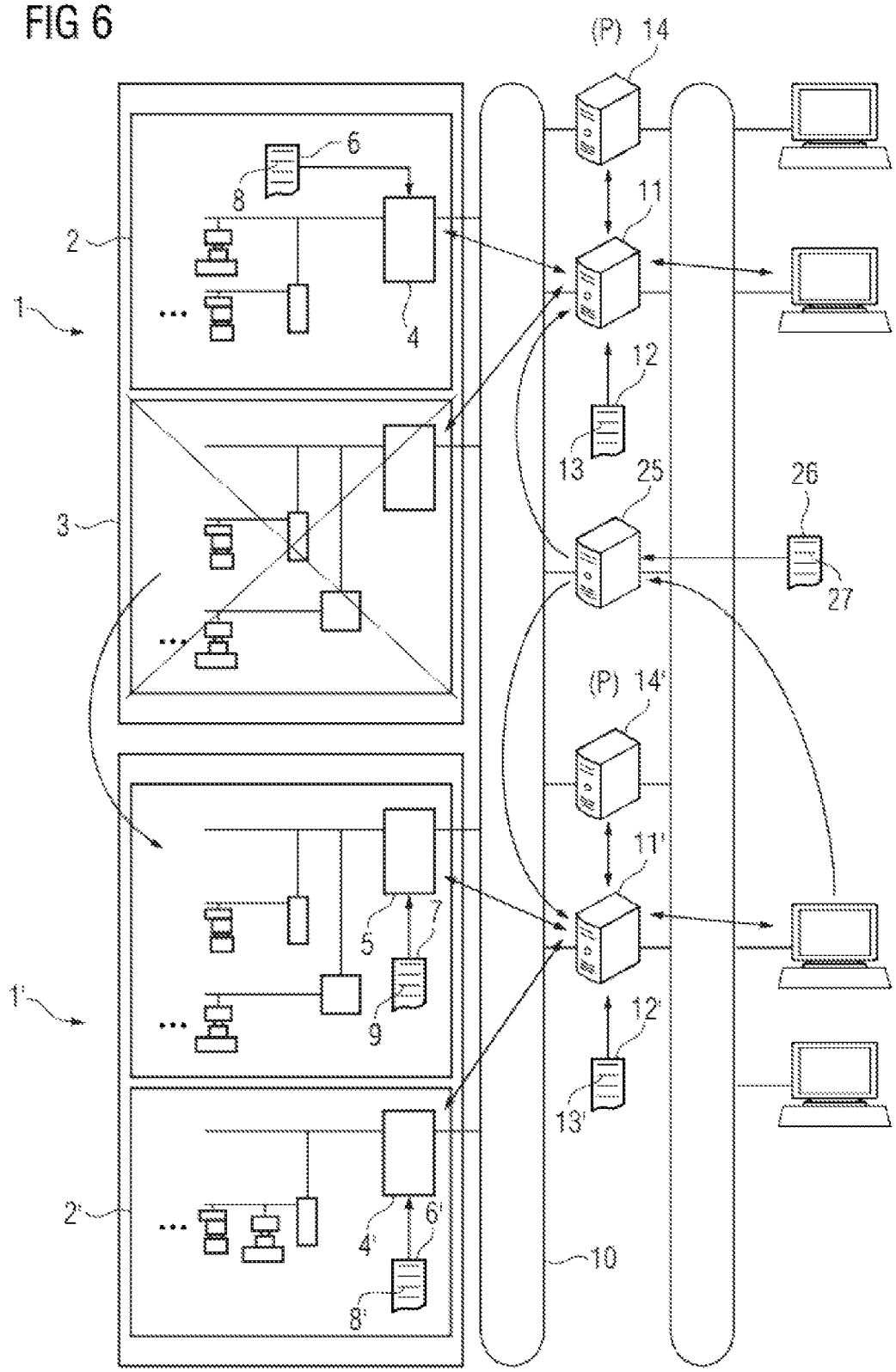
FIG. 6 shows a modification of the industrial technical installation of FIG. 1 and the automation structure thereof.

FIG. 6 shows an expansion of FIG. 1. In FIG. 6, a further industrial technical installation 1' is additionally present, which is controlled by a further automation server 11'. The further industrial technical installation 1' comprises a further installation part 2', which is controlled by a further automation unit 4'. The installation part 3 is also part of the further industrial technical installation 1', however. In order to control the further industrial technical installation 1', the further automation server 11' therefore has to communicate with the further automation unit 4' and the automation unit 5.

The structure and the mode of operation of the industrial technical installation 1' may correspond with the structure and the mode of operation of the industrial technical installation 1 from an automation technology perspective. In particular, the automation server 11' of the further industrial technical installation 1' operates in the same manner as has been explained above in connection with FIG. 4 for the automation server 11. For the same reason, the further automation unit 4' and the further automation server 11' are programmed with corresponding programs 6', 12', where the programs 6', 12' have corresponding machine code 8', 13', the processing of which determines the respective mode of operation and functionality of the further automation unit 4' and the further automation server 11'. For this reason, the further engineering server 14' is also present, in which the parameters P' for the further automation server 11' are recorded.

The further industrial technical installation 1', as already mentioned, also comprises the installation part 3 in addition to the further installation part 2'. In order to control the further industrial technical installation 1', the further automation server 11' not only needs access to the further automation unit 4', but also access to the automation unit 5.

In the following, it is assumed that initially (as shown in FIG. 1) the industrial technical installation 1 is controlled by the automation server 11, and the industrial technical installation 1' is to be controlled by the automation server 11' at a later point in time. As a result, in accordance with the representation in FIG. 6, the installation part 3 has to be transferred from the industrial technical installation 1 to the further industrial technical installation 1'. Initially, the installation part 3 is therefore integrated into the industrial technical installation 1. At a later point in time, it is to be released from the industrial technical installation 1 and allocated to the industrial technical installation 1'. The allocation of the installation part 3 may therefore vary dynamically.

In order to realize the transfer, the installation part 3 itself naturally has to be transferred from the industrial technical installation 1 to the industrial technical installation 1'. The transfer of the installation part 3 as such is not the subject matter of the present invention. It must also be ensured, however, that, until the transfer, the automation server 11 and only the automation server 11 can access the automation unit 5, and after the transfer, the automation server 11' and only the automation server 11' can access the automation unit 5. Therefore, in addition to the mechanical-physical transfer of the installation part 3, the communication-related transfer of the associated automation unit 5 must take place. The realization of the communication-related transfer is the subject matter of the present invention. The realization is established in the manner of communication explained above in connection with FIGS. 2 to 5.

First, in addition to the automation server 11, the automation server 11' is also connected to the automation unit 5 via the communication network 10. In order to enable a simple communication-related transfer of the automation unit 5, i.e., to modify the allocation so that the automation unit 5 is no longer allocated to the automation server 11, but rather to the automation server 11', the automation system additionally comprises a central management unit 25. The central management unit 25 is connected to the automation servers 11, 11' and the automation unit 5 via the communication network 10. In general, there is also a connection to the automation units 4, 4', which are exclusively used by the one industrial technical installation 1, 1' or the other. This is of lesser importance, however.

The mode of operation of the central management unit 25 is determined by a corresponding program 26, with which the central management unit 25 is programmed. The program 26 comprises machine code 27, which can be processed by the central management unit 25. The functions and actions of the central management unit 25 explained below, i.e., the procedure of FIGS. 7 and 8, therefore occur with the processing, and based on the processing of the corresponding machine code 27 by the management unit 25. It should furthermore be noted that the transfer of the automation unit 5 from the industrial technical installation 1 to the industrial technical installation 1' is explained below. Other transfers are realized in an analogous manner.

The central management unit 25 can perform an operating method as explained in greater detail below in connection with FIG. 7. Alternatively, the central management unit 25 can perform an operating method, as explained in greater detail below in connection with FIG. 8.

Figure 7:
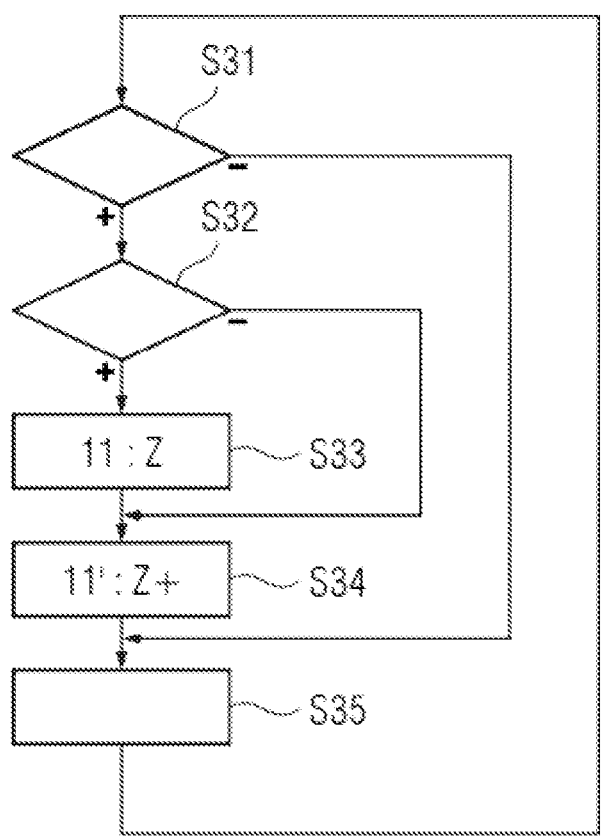
FIG. 7 shows a flow diagram in accordance with a further embodiment of the invention.

With reference to FIG. 7, in a step S31, the central management unit 25 checks whether an event has occurred, on the basis of which the automation unit 5 is to be released from the industrial technical installation 1 and allocated to the industrial technical installation 1'. For example, in step S31, the central management unit 25 can check whether it has obtained a corresponding request for the automation unit 5 from the automation server 11'. If the event has occurred, then the central management unit 25 performs steps S32 to S34.

In step S32, the central management unit 25 checks whether the automation unit 5 is assigned in other ways, i.e., is allocated to the automation server 11, for example. If this is the case, then the central management unit 25 proceeds to step S33. In step S33, the central management unit 25 revokes the certificate Z that is allocated to the automation unit 5, i.e., the certificate Z that contains the public key 20 of the automation unit 5, which the automation server 11 uses for encryption and decryption in steps S7 and S10, from the automation server 11. The automation server 11 is no longer able to access the certificate Z as a result. Alternatively or additionally, the central management unit 25 may revoke (at least) another certificate Z, which the automation server 11 uses in the context of checking the chain of trust (cf. steps S2 to S6 in FIG. 4), from the automation server 11. In particular, the central management unit 25 can revoke the certificate Z that contains its own public key 20, i.e., the public key 20 of the public management unit 25, from the automation server 11. In both cases, this causes the chain of trust to be interrupted and therefore invalid as a result.

After this, the central management unit 25 proceeds to step S34. In step S34, the central management unit 25 communicates the corresponding chain of trust (or missing parts of the chain of trust) to the automation server 11'. In particular, in step S34, the central management unit 25 transmits at least one of the certificates Z, which the further automation server 11' utilizes in the context of checking the chain of trust (cf. again steps S2 to S6 in FIG. 4, which are also performed by the automation server 11' in an analogous manner). Through the communication of the chain of trust, which is required for the validation of the certificate Z of the automation unit 5, it is therefore made possible for the further automation server 11' to communicate with the automation unit 5. For example, in step S34, the central management unit 25 may transmit the certificate Z, which contains the public key 20 of the automation unit 5, to the further automation server 11'. Alternatively or additionally, the central management unit 25 may transmit another certificate Z to the further automation server 11', where automation server 11 needing the certificate in the context of checks the chain of trust, for example, the certificate Z that contains its own public key 20, i.e., the public key 20 of the central management unit 25.

Following step S34, the central management unit 25 proceeds to a step S35. In step S35, the central management unit 25 performs tasks that are of lesser importance in the context of the present invention. For example, the central management unit 25 may replace or supplement certificates Z that are due to expire with new certificates Z. The central management unit 25 also then performs step S35 if the event of step S31 has not occurred.

Figure 8:
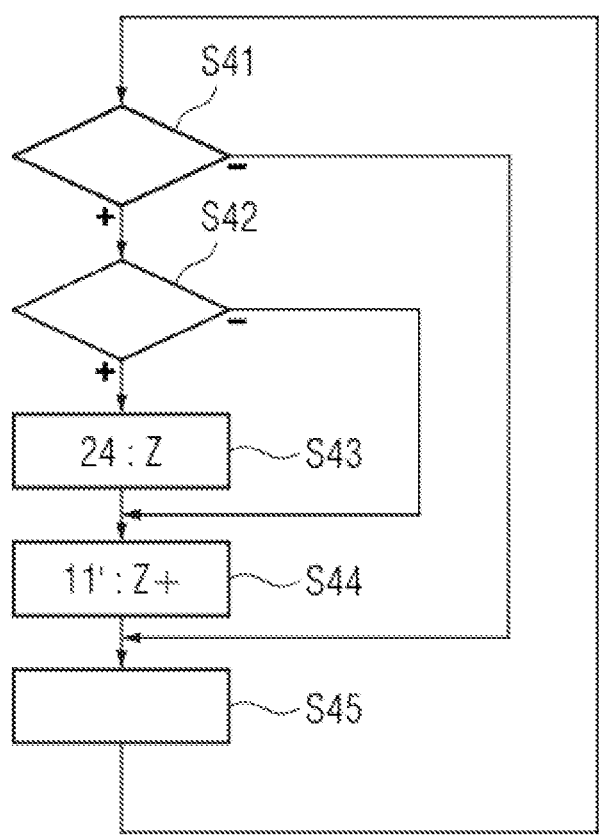
FIG. 8 shows a flow diagram in accordance with another embodiment of the invention.

FIG. 8 comprises steps S41 to S45. Steps S41, S42 and S45 correspond 1:1 to steps S31, S32 and S35 from FIG. 7. In step S43, the central management unit 25 enters a blocking of the certificate Z, which is allocated to the automation unit 5, into the black list 24. In step S44, the central management unit 25 creates a new certificate Z, which contains the public key 20 of the automation unit 5, and transmits the certificate Z to the further automation server 11'.

The direct blocking by the management unit 25 itself is possible because, in the present case, it is assumed that the central management unit 25 has created the certificate Z itself. Alternatively or additionally, however, in step S43, the central management unit 25 may also prompt a blocking of another certificate Z that has not been created by the management unit 25. Here, in step S43, the central management unit 25 transmits a corresponding request to the unit which has created the certificate Z.

In step S44, the management unit 25 transmits a corresponding new certificate Z, which replaces the blocked certificate Z, to all units using the certificate Z that has now become blocked. Here, the automation server 11 forms an exception. The new certificate Z is not transmitted to the automation server 11. The new certificate Z is, however, transmitted from the central management unit 25 to the further automation server 11'. If necessary, the central management unit 25 has to transmit a corresponding request for the transmission of certificates Z to other units, in an analogous manner to step S43.

Regardless of whether the procedure according to FIG. 7 or the procedure according to FIG. 8 is realized, the central management unit 25 prevents the further communication of the automation server 11 with the automation unit 5 as a result and enables the communication of the further automation server 11' with the automation unit 5.

As previously explained, a fully analogous procedure also occurs when other transfers from automation units 4, 4' to automation servers 11, 11' are to be undertaken. As a result, the central management unit 25 therefore only communicates the respective chain of trust to a respective automation server 11, 11' when it has previously revoked chains of trust determined for communication with the corresponding automation unit 5 from all other automation servers 11, 11', or has blocked corresponding certificates Z or has prompted the blocking thereof. Naturally, the case may also occur in which these certificates Z are otherwise invalid, such as due to a time lapse. In the context of the present invention, this is also covered by steps S31 to S45.

The central management unit 25 therefore releases the access of the respective automation server 11, 11' to a particular automation unit 5 on demand and also blocks it again on demand. In this context, the management unit 25 ensures that a maximum of one single automation server 11, 11' can access a particular automation unit 5 at a particular point in time.

In summary, the present invention therefore relates to the an automation system that comprises at least one automation unit 5 and a plurality of automation servers 11, 11', as well as a central management unit 25, which are interconnected via a communication network 10. The automation servers 11, 11' communicate with the automation unit 5 using a certificate Z of the automation unit 5 which has been communicated to them. Beforehand, however, automation servers 11, 11' validate this certificate Z. The automation unit 5 controls an installation part 3 of an industrial technical installation 1, 1' in accordance with the communication with the respective automation server 11, 11'. In order to validate the certificate Z, the automation servers 11, 11' check a chain of trust of the respective certificate Z and, by accessing a black list 24, the validity thereof. A reference 23 to the storage location, at which the black list 24 is stored, is contained in the communicated certificate Z. The central management unit 25 communicates the respective chain of trust to the respective automation server 11, 11' in order to enable the communication with the automation unit 5. In order to prevent the communication, the central management unit 25 revokes the respective chain of trust from the respective automation server 11, 11' or prompts the certificate Z of the automation unit 5 to be entered into the black list 24. The communication of the respective chain of trust only occurs when the corresponding chains of trust are revoked from all other automation servers 11, 11' beforehand, corresponding certificates Z are entered into the black list 24 or the certificate Z is otherwise invalid.

The present invention is therefore based on the knowledge that it is sufficient to manage the certificates Z, which the automation servers 11, 11' need to realize the communication with the automation unit 5, in a suitable manner. On the one hand (FIG. 7), it is possible for the central management unit 25 itself to be able to write certificates Z into a memory or delete them from the memory, where the corresponding automation server 11, 11' accesses this memory to validate the chain of trust. Alternatively, it is possible for the central management unit 25 to be able to distribute certificates Z itself, but unable to delete them again. In this case, the central management unit 25 prompts a corresponding entry in the black list 24. The corresponding certificate Z can no longer be used thereafter. In both cases, it is not required to change the parameterization P, P' of the automation servers 11, 11'. Rather, this may be created in a one-time manner in advance and no longer has to be changed thereafter. The automation servers 11, 11' therefore have the information, on an ongoing basis, on which installation parts 2, 3, 2' (more precisely: from the perspective of the respective automation server 11, 11', which automation units 4, 4', 5) must be present, in order to perform the respective automation task. The parameterization of the automation servers 11, 11' may therefore occur independently of the communication of chains of trust, the revocation of chains of trust and the blocking of certificates Z. Nevertheless, a communication that is undesirable in the respective context is reliably avoided.

Although the invention has been illustrated and described in greater detail with the preferred exemplary embodiment, the invention is not restricted by the examples disclosed and other variations can be derived therefrom by the person skilled in the art without departing from the protective scope of the invention.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for operating an automation system comprising at least one automation unit and a plurality of automation servers connected to the automation unit via a communication network, the method comprising:
    utilizing, by the plurality of automation servers, a certificate of the at least automation unit to communicate with the at least one automation unit, said certificate being communicated to the plurality of automation servers;
    validating, by the plurality of automation servers, the certificate of the automation unit prior to communication with the automation unit;
    controlling, by the at least one automation unit, an installation part of an industrial technical installation in accordance with communication with a respective automation server of the plurality of automation servers;
    checking, by the plurality of automation servers, a chain of trust of the certificate to validate the certificate and checking and accessing a black list to validate the certificate, the black list being stored at a storage location and a reference to the storage location being contained in the communicated certificate;
    wherein the automation system further comprises a central management unit which is connected to the plurality of automation servers and the automation unit via the communication network, the method further comprising:
    communicating, by the central management unit, a respective chain of trust to the respective automation server to enable communication of the respective automation server with the automation unit;
    one of (i) revoking, by the central management unit, the respective chain of trust from the respective automation server of the plurality of servers to prevent the communication of the respective automation server with the automation unit and (ii) prompting the certificate of the automation unit, which has been valid until the prompting of the certificate occurs, to be entered into the black list; and
    communicating, by the central management unit, the respective chain of trust to the respective automation server only when one of (i) the central management unit has previously revoked all chains of trust determined for communication with the automation unit from all other automation servers, (ii) the central management unit has prompted the certificate of the automation unit, which has been valid until the central management unit prompted the certificate, to be entered into the black list and (iii) the certificate of the automation unit is otherwise invalid.

2. The operating method as claimed in claim 1, wherein the plurality of automation servers ascertain, based on a respective parameterization, whether said plurality of automation servers must communicate with the automation unit to perform an automation task specific to said plurality of automation servers;
    and wherein the parameterization of the plurality of automation servers occurs independently of communication and revocation of chains of trust and blocking of certificates.

3. The operating method as claimed in claim 1,
    wherein the respective automation server requests allocation of the automation unit at the central management unit to obtain a respective chain of trust; and wherein the central management unit, based on the request, undertakes revocation of a chain of trust of a certificate of the automation unit communicated to another automation server, or prompts blocking of the certificate of the automation unit communicated to another automation server and undertakes communication of respective chain of trust to the requesting automation server.

4. The operating method as claimed in claim 2,
    wherein the respective automation server requests allocation of the automation unit at the central management unit to obtain a particular chain of trust; and wherein the central management unit, based on the request, undertakes revocation of a chain of trust of a certificate of the automation unit communicated to another automation server, or prompts blocking of the certificate of the automation unit communicated to another automation server and undertakes communication of the particular chain of trust to the requesting automation server.

5. An automation system, comprising:
    a communication network;
    at least one automation unit;
    a plurality of automation servers connected to the automation unit via the communication network;
    wherein the plurality of automation servers are programmed utilize a certificate of the at least one automation unit to communicate with the at least one automation unit and validate the certificate of the automation unit prior to communication with the automation unit,
    said certificate being communicated to the plurality of automation servers;
    wherein the at least one automation unit is programmed to control an installation part of an industrial technical installation in accordance with communication with a respective automation server of the plurality of automation servers;
    wherein the plurality of automation servers are further programmed to check a chain of trust of the certificate to validate the certificate and check and access a black list to validate the certificate, the black list being stored at a storage location and a reference to the storage location being contained in the communicated certificate;
    wherein the automation system additionally comprises a central management unit, which is connected to the automation servers and the automation unit via the communication network;

wherein the central management unit is programmed to communicate a respective chain of trust to the respective automation server to enable communication of the respective automation server with the automation unit;

wherein the central management unit is programmed to one of (i) revoke the respective chain of trust from the respective automation server of the plurality of servers to prevent the communication of the respective automation server with the automation unit and (ii) prompt the certificate of the automation unit, which has been valid until the prompting of the certificate occurs, to be entered into the black list; and wherein the central management unit is programmed to only communicate the respective chain of trust to the respective automation server when one of (i) all chains of trust determined for communication with the automation unit from all other automation servers have been previously revoked, (ii) the certificate of the automation unit has been prompted to be entered into the black list, wherein the certificate has been valid until the certificate has been promoted, and (iii) the certificate of the automation unit is otherwise invalid.

6. The automation system as claimed in claim 5, wherein the plurality of automation servers are programmed to ascertain, based on a respective parameterization, whether communication with the automation unit must occur in order to perform an automation task specific to said plurality of automation servers; and wherein the parameterization of the plurality of automation servers occurs independently of communication and revocation of chains of trust and blocking of certificates.

7. The automation system as claimed in claim 6, wherein the plurality of automation servers are programmed to request allocation of the automation unit at the central management unit to obtain a respective chain of trust; and wherein the central management unit is programmed, based on the request, to undertake revocation of a chain of trust of a certificate of the automation unit communicated to another automation server, or prompt the blocking of a certificate of the automation unit communicated to another automation server and undertake communication of respective chain of trust to the requesting automation server.

8. The automation system as claimed in claim 6, wherein the plurality of automation servers are programmed to request allocation of the automation unit at the central management unit to obtain a particular chain of trust; and wherein the central management unit is programmed, based on the request, to undertake revocation of a chain of trust of a certificate of the automation unit communicated to another automation server, or prompt the blocking of a certificate of the automation unit communicated to another automation server and undertake communication of the particular chain of trust to the requesting automation server.

* * * * *